United States Patent
Bryan et al.

(10) Patent No.: US 8,062,392 B2
(45) Date of Patent: Nov. 22, 2011

(54) SMALL DISTRIBUTED GASIFICATION UNITS WITH SYNGAS TRANSPORTATION VIA PIPELINE NETWORK FOR BIOMASS TREATMENT

(75) Inventors: Paul F. Bryan, Pinole, CA (US); Yunquan Liu, Katy, TX (US); Curtis L. Krause, Houston, TX (US)

(73) Assignee: Texaco Inc., San Ramon, CA (US)

( * ) Notice: Subject to any disclaimer, the term of this patent is extended or adjusted under 35 U.S.C. 154(b) by 512 days.

(21) Appl. No.: 12/336,928

(22) Filed: Dec. 17, 2008

(65) Prior Publication Data

US 2010/0150794 A1    Jun. 17, 2010

(51) Int. Cl.
*C10B 1/00* (2006.01)
*C10J 3/00* (2006.01)
*C10J 3/72* (2006.01)
*B01J 19/00* (2006.01)

(52) U.S. Cl. ............ 48/89; 48/108; 48/111; 48/119; 422/188

(58) Field of Classification Search .......... 48/89, 108, 48/111, 119; 422/188
See application file for complete search history.

(56) References Cited

U.S. PATENT DOCUMENTS

| 4,469,488 A | 9/1984 | Calderon | |
|---|---|---|---|
| 2010/0150794 A1* | 6/2010 | Bryan et al. | 422/188 |

FOREIGN PATENT DOCUMENTS

| JP | 2006-205135 | 8/2006 |
|---|---|---|
| JP | 2008-001498 | 1/2008 |

OTHER PUBLICATIONS

International Search Report and Written Opinion, International Application No. PCT/US2009/068263, dated Aug. 2, 2010.

* cited by examiner

*Primary Examiner* — Timothy Vanoy
(74) *Attorney, Agent, or Firm* — Melissa Patangia

(57) ABSTRACT

The present invention discloses a system for biomass treatment which addresses the need to find economical solutions to transport biomass. In the present invention, small, distributed gasifiers convert the biomass into synthesis gas ("syngas"). The syngas is then transported via a pipeline network to a central fuel production facility.

14 Claims, 2 Drawing Sheets

SMALL DISTRIBUTED GASIFICATION UNITS WITH SYNGAS TRANSPORTATION VIA PIPELINE NETWORK FOR BIOMASS TREATMENT

FIELD OF THE INVENTION

The present invention relates generally to a system for biomass treatment and specifically to using small distributed gasifiers for biomass gasification and transporting the synthesis gas produced via a pipeline network.

BACKGROUND OF THE INVENTION

For a variety of reasons, more and more interest is recently being paid to the production of biofuels. For example, biofuels are renewable and have less emissions when combusted. Biofuels may be categorized according to their feedstock. The feedstocks for first generation biofuels include sugar, starch, vegetable oils, and animal fats. The feedstocks for second generation or next generation biofuels are basically non-food crops and other biomass resources such as switchgrass, agricultural wastes, and forest residues.

To meet the increasing demand for biofuels, technologies for making next generation biofuels are being investigated. Due to the relatively low energy density (per volume) of biomass, the transportation of biomass to biorefineries for biofuels production has been a challenge. Over the past several years, people have been trying to develop various effective ways to improve biomass transportation economics.

One solution to the above challenge is to use pyrolysis technology to convert the biomass on-site into a liquid called bio-oil, and then transport the bio-oil by tank trucks to a central plant for further upgrading. This type of solution employs small, distributed or mobile pyrolysis units to convert the biomass into bio-oil. However, due to its acidity, bio-oil from a pyrolysis unit is not suitable for pipeline transportation, as it could damage the existing infrastructures; also, its fluidity at lower temperature is still an issue due to its relatively higher viscosity. Therefore, alternate systems which can convert biomass into other intermediate products that can also be delivered to a central plant more conveniently and economically are desired.

SUMMARY OF THE INVENTION

The present invention discloses a system for biomass treatment which addresses the need to find economical solutions to transport biomass. In the present invention, small, distributed gasifiers convert the biomass into synthesis gas ("syngas"). The syngas is then transported via a pipeline network to a central fuel production facility.

BRIEF DESCRIPTION OF THE FIGURES

The description is presented with reference to the accompanying figures in which.

Figure 1:
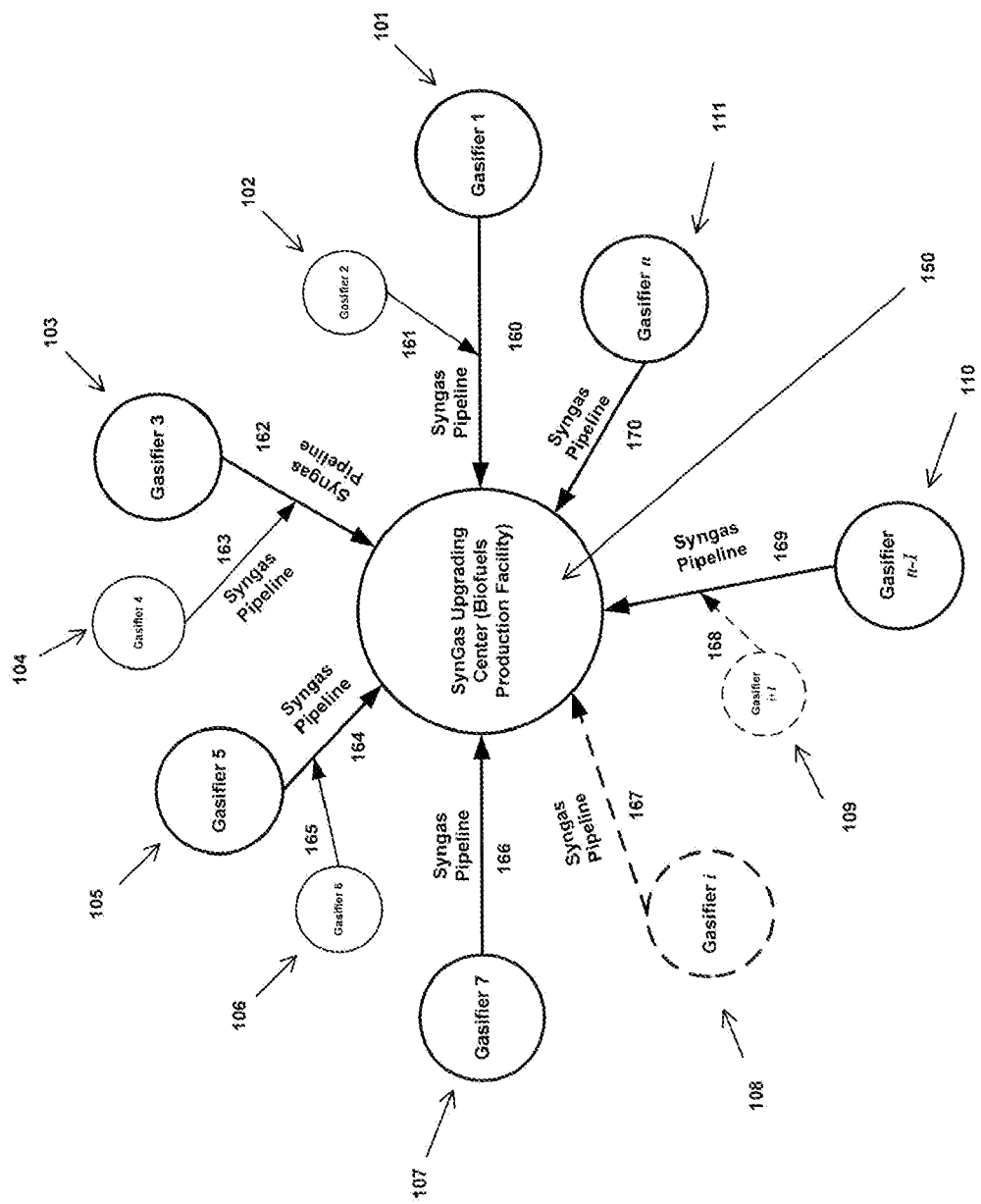
FIG. 1 depicts one embodiment of the system of the present invention utilizing small distributed gasification units with a syngas transportation pipeline network.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

In the present invention, a distributed gasification and syngas transportation system is disclosed. In the present invention, gasification technology is first used to gasify biomass in small, distributed gasifiers. Next, the syngas from the gasifiers is transported through a pipeline network to a central fuel-production facility.

1. Definitions

Certain terms are defined throughout this description as they are first used, while certain other terms used in this description are defined below:

"Biofuel," as defined herein, is a fuel product at least partly derived from "biomass."

"Biomass," as defined herein, is a renewable resource of biological origin.

"Bio-oil" or "Pyrolysis Oil," as defined herein, refers. to a liquid hydrocarbon product resulting from the pyrolyzing treatment of biomass material.

"Bio-refinery," as defined herein, generally refers to a facility that integrates biomass conversion processes and equipment to produce fuels from biomass.

A "gasifier" or a "gasification unit," as defined herein, refers to a reaction environment wherein biomass material is converted into gaseous products through the action of heat and possibly one or more reactive gases such as oxygen, air, carbon dioxide ($CO_2$), and/or steam.

"Pyrolysis," as defined herein, refers to a thermal processing and/or thermal decomposition of biomass material, wherein said decomposition is typically carried out in a non-oxidative environment and at relatively lower temperature compared to gasification.

"Refinery," as defined herein, generally refers to an oil refinery, or aspects thereof, where crude oil (or other fossil fuels such as coal or natural gas) is processed. Processes carried out at such refineries include, but are not limited to, reforming, cracking, distilling, hydroprocessing and the like.

"Synthesis gas," or "syngas," as defined herein, generally refers to a mixture of carbon monoxide (CO) and hydrogen ($H_2$) produced by gasification in a gasifier. General oxidative routes from hydrocarbons to syngas are as follows:

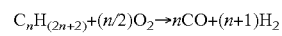

$$C_nH_{(2n+2)} + (n/2)O_2 \rightarrow nCO + (n+1)H_2$$

"Water Gas Shift Reaction" or "WGS", as defined herein, generally refers to a reaction between carbon monoxide (CO) and steam ($H_2O$) to produce carbon monoxide ($CO_2$) and hydrogen ($H_2$) as follows:

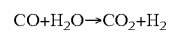

$$CO + H_2O \rightarrow CO_2 + H_2$$

2. The System of the Present Invention

Gasification has been used in coal-fired power plants to generate synthesis gas ("syngas") for power generation via integrated gasification combined cycle (IGCC) process. Gasification has also been used in the petroleum industry to gasifiy heavy oils to generate syngas for making synthetic fuels such as like synthetic diesel fuel via the Fischer-Tropsch (F-T) process.

In order to utilize gasification technology for the production of biofuels, a centralized biomass gasification plant could be constructed and the biomass could be gathered from various locations and transported to the plant by trucks. However, due to the low energy density of biomass per volume of biomass, the economics would likely not support this solution. In addition, the construction of a large centralized biomass gasification plant might not be more economic than putting a number of small, distributed gasification units that add up to the same treatment capacity.

As an alternative, in the system of the present invention, small, distributed gasification units are deployed and the generated syngas is transported via a pipeline network to a central fuel production facility. The central fuel production facility may be a bio-refinery, a traditional refinery, or another plant capable of receiving syngas and producing a biofuel.

With reference to FIG. 1, FIG. 1 depicts one embodiment of the system of the present invention utilizing small distributed gasification units with a syngas transportation pipeline network. As shown in FIG. 1, a number of small, distributed gasification units 101 through 111 are deployed in various locations.

FIG. 1 is an illustration of one embodiment of the system of the present invention—there may be any number of gasification units—there may be a greater number or a fewer number of gasification units than that depicted in FIG. 1. The exact configuration of each implementation of the system of the present invention will depend in part on the economics for each specific system. The appropriate size of the individual gasification units and the appropriate number of gasification units to be built depends on many factors including the amount of biomass available in each location (within a certain radius) and the total available amount of biomass around the central fuel production facility. For large areas with more biomass resources, a bigger gasification unit may be built; while for places with less or relatively small amounts of biomass, a smaller gasification unit or even a mobile unit may be used. For example, a gasification unit with a capacity of 200 ton/day of biomass could be built for an area with a 50 kilometers radius, while a unit of 50 ton/day of biomass might be the best fit for an area with a 25 kilometers radius. For best results, in each specific scenario, a detailed cost study taking into account a variety of factors including the truck transportation costs from the biomass field to the gasification unit should be completed. In addition, to determine the total number of gasification units to be built, the cost of both the gasification units and the pipeline network should be considered.

While the economics of each specific implementation will impact the exact configuration of the pipeline network. the geographic shape and the difficulty of the layout of the pipeline network will also need to be considered in arranging the pipeline network.

As shown in FIG. 1, each of the gasification units 101 through 111 is connected to the central fuel production facility 150 via a pipeline network 160 through 170. For example, the first gasification unit 101 is connected to the central fuel production facility 150 via a first syngas pipeline 160. The syngas produced from biomass at the first gasification unit 101 is transported to the central fuel production facility 150 via the first syngas pipeline 160. Similarly, the second gasification unit 102 is connected to the central fuel production facility 150 via a second syngas pipeline 161 and a first syngas pipeline 160.

The system of the present invention addresses the need for an economical system to transport biomass for biofuels production. In addition, the system of the present invention eliminates the large capital investment that would be required for a large centralized biomass gasification plant. Instead, the small, distributed gasification units may be built and installed individually as needed. The collection of small, distributed gasification units could equal or exceed the capacity of the large centralized biomass gasification plant.

Further, the system of the present invention addresses the safe and effective transportation of syngas via a pipeline network. Syngas is known to have a corrosive and explosive nature. Specifically, the $CO/H_2$ mixture of Syngas is highly toxic and syngas is prone to self-ignition due to the tendency of hydrogen to heat up when it expands through a leak.

In response, in another embodiment, a water-gas-shift (WGS) reaction may be associated with the gasifier and run at the gasifier location. After the WGS reaction, the tuned syngas that is transported via the pipeline comprises 3 parts hydrogen to 1 part carbon dioxide. This tuned syngas would not be toxic. In addition, since it would be lighter than air it would be prone to disperse if it leaked. Further, it is expected that the carbon dioxide would at least partially offset the heating/self-igniting problem and may solve it entirely. A reverse WGS reaction may be needed at the central fuel production facility depending on the catalysts used for the syngas.

With the addition of the WGS reaction, the resulting infrastructure could be adapted for future use in a "hydrogen economy." Specifically, the modified syngas could be withdrawn at any point along the pipeline and purified reasonably simply to make pure $H_2$ for fuel cells.

As an alternative to running a WGS reaction at the gasifier location, the syngas could be transported via the pipeline network after some impurities or water are removed. For example, impurities or water could be removed to comply with applicable guidelines for transmission pipeline networks such as the European Industrial Gases Association (EIGA) guidelines for syngas transportation system design via pipelines. In addition, hydrogen sulfide ($H_2S$), ash, and/or water could be removed prior to introducing the syngas into the pipeline network to minimize the problems like corrosion.

Figure 2:
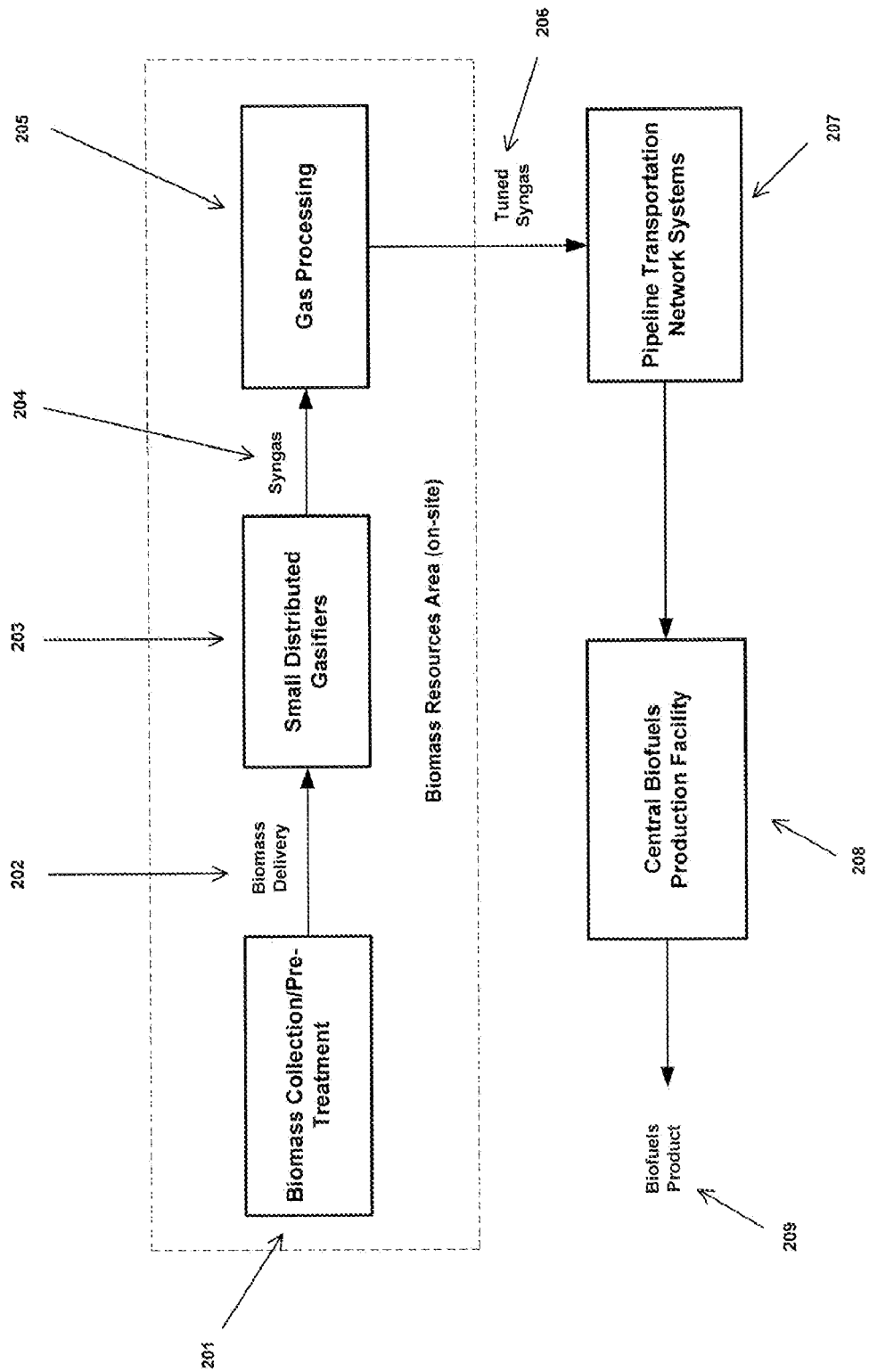
FIG. 2 depicts one embodiment of the overall process flow diagram of the system of the present invention which utilizes small distributed gasification units with a syngas transportation pipeline network.

With reference to FIG. 2, FIG. 2 depicts an overall process flow diagram of the system of the present invention which utilizes small distributed gasification units with a syngas transportation pipeline network. The first step 201 includes the collection and pretreatment (as necessary) of the biomass. Tasks within this step may include gathering, grinding, and/or drying the biomass. The biomass for next generation biofuels includes non-food crops and other biomass resources such as switchgrass, agricultural wastes, and forest residues.

Next, the collected biomass 202 is delivered to a small, distributed gasifier 203. The addition of the collected biomass to the gasifiers 203 may be accompanied by the addition of air or oxygen ($O_2$) as needed (not shown). Syngas 204 is produced by the gasifiers 203. As discussed above, the syngas 204 may optionally undergo some processing steps in a processing unit 205 before being introduced into the pipeline network 207. For example, the processing steps may include the removal of hydrogen sulfide ($H_2S$), alkali compounds, ash, and/or water. Further the processing may include a WGS reaction. The foregoing steps occur on site at the biomass locations.

The tuned syngas 206 exiting the processing unit 205 is then introduced into the pipeline network 207. The pipeline network 207 will resemble traditional pipeline networks and will include typical equipment such as compressor stations and water-gas separators. The tuned syngas will be transported to the central fuel production facility 208 via the pipeline network 207.

The central fuel production facility 208 may include a control or metering system for the incoming tuned syngas. In addition, a reverse WGS reaction may be needed at the central fuel production facility depending on the catalysts used for the syngas. Finally, the central fuel production facility 208 produces the biofuels product 209.

While the methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A system for biomass treatment comprising:
    collecting and pretreating biomass;
    delivering the biomass to small, distributed gasifiers wherein the small, distributed gasifiers produce a syngas from the biomass;
    introducing the syngas to a pipeline network;
    transporting the syngas to a central fuel production facility via the pipeline network; and
    producing a biofuels product at the central fuel production facility.

2. The system of claim 1 wherein collecting and pretreating the biomass comprises gathering the biomass.

3. The system of claim 1 wherein collecting and pretreating the biomass comprises grinding the biomass.

4. The system of claim 1 wherein collecting and pretreating the biomass comprises drying the biomass.

5. The system of claim 1 further comprising adding air to the small, distributed gasifiers to produce the syngas.

6. The system of claim 1 further comprising processing the syngas produced from the small, distributed gasifiers.

7. The system of claim 6 wherein processing the syngas comprises removing hydrogen sulfide.

8. The system of claim 6 wherein processing the syngas comprises removing alkali compounds.

9. The system of claim 6 wherein processing the syngas comprises removing ash.

10. The system of claim 6 wherein processing the syngas comprises removing water.

11. The system of claim 6 wherein processing the syngas comprises a water gas shift reaction.

12. The system of claim 1 wherein the central fuel production facility is a biorefinery.

13. The system of claim 1 wherein the central fuel production facility is a refinery.

14. The system of claim 1 wherein the small, distributed gasifiers are mobile units.

\* \* \* \* \*